Jan. 26, 1965  R. H. SWART, JR  3,167,114
HEAT PUMP CONTROL
Filed Aug. 16, 1961  2 Sheets-Sheet 1
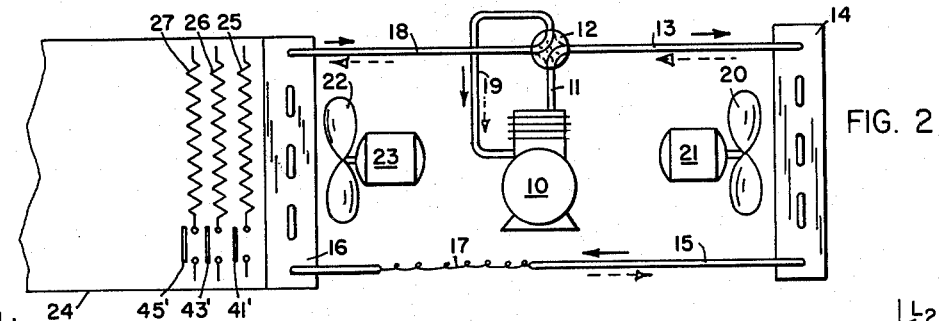
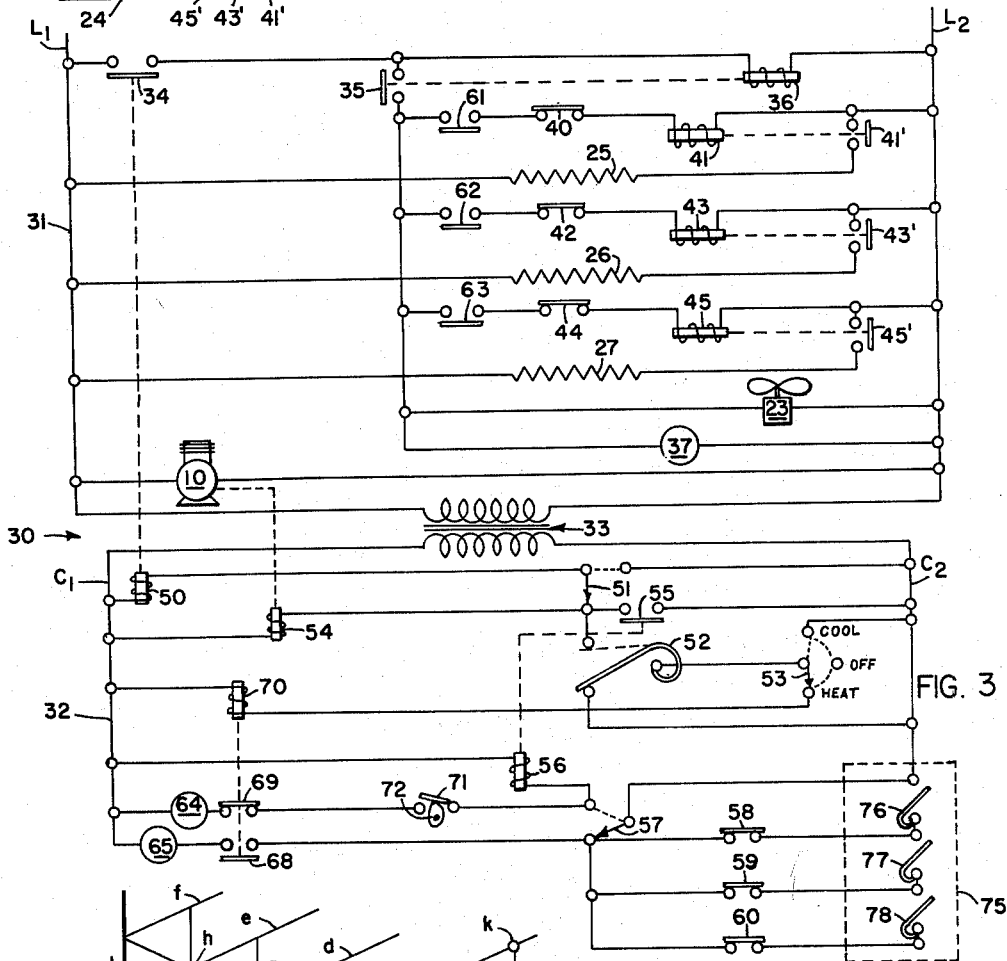
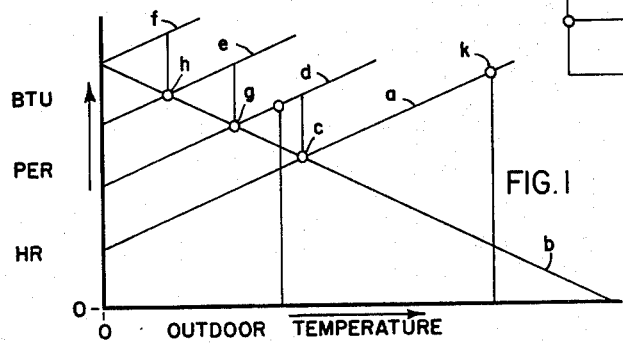
INVENTOR.
RICHARD HOUGHTON SWART, JR.
BY
ATTORNEY.

Jan. 26, 1965    R. H. SWART, JR    3,167,114
HEAT PUMP CONTROL
Filed Aug. 16, 1961    2 Sheets-Sheet 2
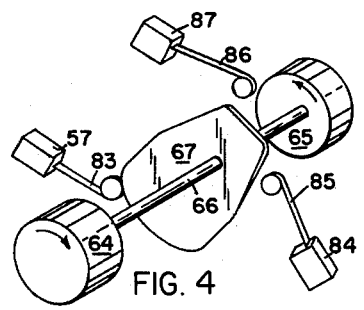
FIG. 4
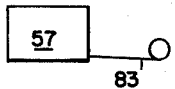
FIG. 6C
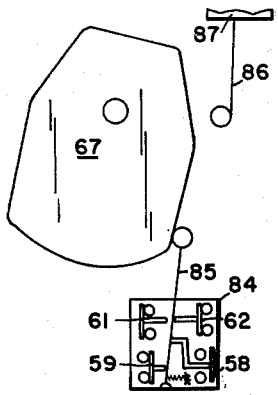
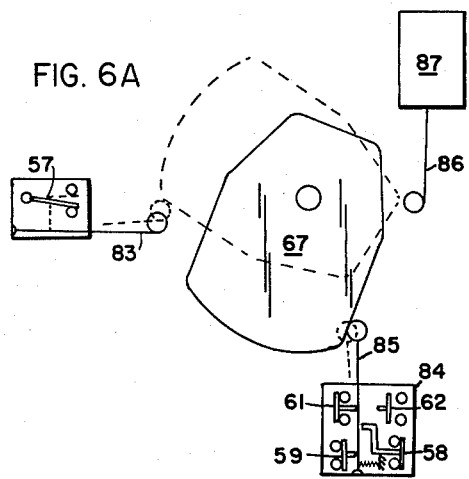
FIG. 6A
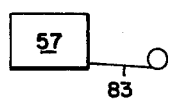
FIG. 6D
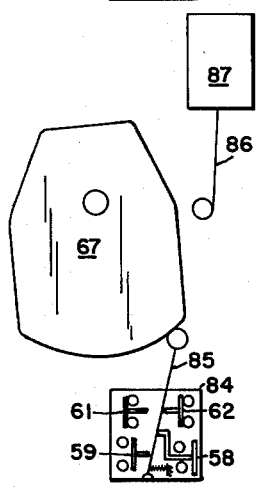
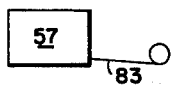
FIG. 6E
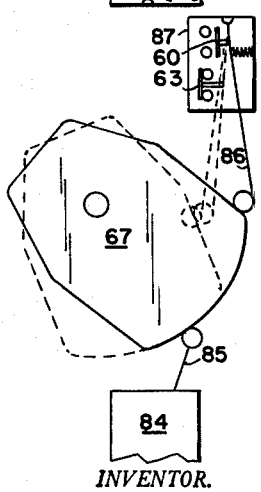
FIG. 6B
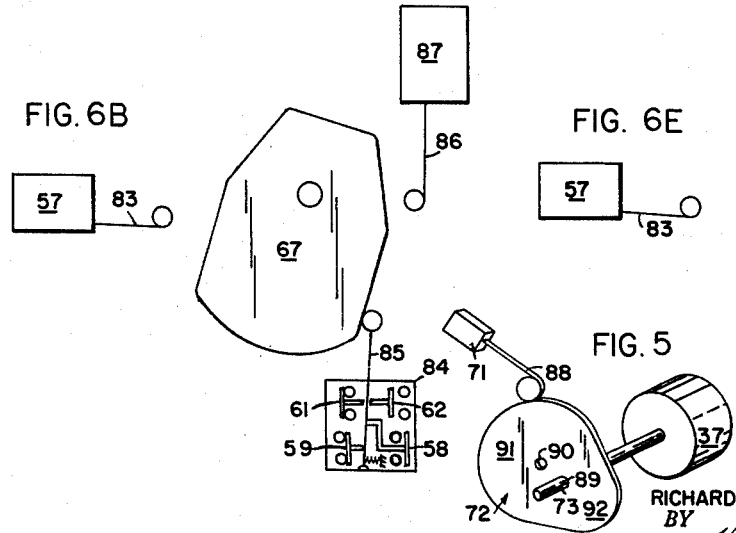
FIG. 5
INVENTOR.
RICHARD HOUGHTON SWART, JR.
BY
ATTORNEY.

United States Patent Office 3,167,114
Patented Jan. 26, 1965

3,167,114
HEAT PUMP CONTROL
Richard Houghton Swart, Jr., Syracuse, N.Y., assignor to Carrier Corporation, Syracuse, N.Y., a corporation of Delaware
Filed Aug. 16, 1961, Ser. No. 131,826
15 Claims. (Cl. 165—2)

This invention relates to air conditioning apparatus, more particularly to control means regulating the energization of auxiliary heaters utilized in conjunction with reverse cycle air conditioning apparatus.

Air conditioning apparatus employing a compression refrigeration system to effect transfer of heat between a conditioned area and the ambient surroundings has been evolved in which the operation of the refrigeration system is made reversible so that the conditioned area may either be cooled or heated as desired. Reversible air conditioning systems of the instant type are referred to as heat pumps. The heat pump is required to furnish heat to the conditioned area under a wide range of outdoor ambient temperatures. At relatively high outdoor temperatures, the capacity of the heat pump is greater than the heat load required in the conditioned area and the heat pump may be cycled on and off by suitable thermostatic control means in the conditioned area. At lower outdoor ambient temperatures, the heat pump operates for longer periods of time, and at the outdoor ambient temperature at which the heat pump capacity equals the requirement of the conditioned area, the heat pump will run continuously.

When the outdoor ambient temperatures fall below the point where the heat pump capacity equals the conditioned area requirement, auxiliary heaters are required. Most commonly these auxiliary heaters are in the form of electrical resistance elements which are energized by the control system employed for controlling operation of the heat pump.

The combined capacity of the heat pump and auxiliary heaters exceed the conditioned area requirements over a range of outdoor temperatures. As the cost of heat derived from the electric heater is greater than the cost of heat derived from the heat pump, it is desired that the electric heaters be maintained operative as little as possible. For most efficient operation of the heat pump with auxiliary resistance heaters, it is desirable to operate the compressor in the refrigeration system continuously and cycle the auxiliary heaters.

Heat pumps operating in very cold outdoor ambients may be provided with several staged auxiliary heaters. Assuming three stages of auxiliary heaters, the second stage is energized at a lower outdoor ambient temperature than that at which the first stage was energized, that is when the combined heating capacities of the heat pump and first stage of auxiliary heat are at or below the conditioned area requirement. Similarly the third stage is energized at a lower outdoor ambient temperature than that at which the second stage was energized.

The conventional thermostatically controlled circuit has not proved adequate to attain desired modes of operation wherein uniform temperature control is maintained in the conditioned area with a minimum power cost.

It is with the above problems and desiderata in mind that the present heat pump control has been evolved, said control including both method and apparatus whereby the operation of the compressor of a heat pump, and the operation of auxiliary heaters may be coordinated so that to attain any given temperature condition in a conditioned area, the operation of the compressor will be maintained constant with a minimum of cycling.

It is accordingly a primary object of this invention to provide air conditioning apparatus having an improved control system therefor.

Another object of the invention is to provide a control for coordinating the operation of the compressor of a heat pump refrigeration system with that of auxiliary heaters so as to minimize the cycling of the refrigerant compressor during heating operation.

It is also an object of the invention to provide improved means for controlling the operation of a heat pump and auxiliary heaters in response to interior and exterior temperature conditions.

A further object of the invention is to increase the amount of useful work obtained from the compressor of a heat pump operating with auxiliary heaters.

These and other objects of the invention which will become hereafter apparent are attained by provision of a control circuit for actuation of auxiliary heaters and the actuation of the indoor fan motor and the compressor motor of a heat pump installation. It is proposed that the novel control circuit operate at voltages which are relatively low as compared to the voltages of the operating circuit for the aforementioned compressor motor, fan motor, and heaters. Thus a 24-volt control circuit may be utilized in conjunction with a 220-volt operating circuit. A modulating timer motor in the operating circuit is provided with a cam which periodically actuates a modulating motor switch in the 24-volt control circuit. This modulating motor is operative so long as the compressor motor is energized. An on-motor and an off-motor driving a common shaft in opposite directions are arranged across the control circuit. The common shaft has a cam to actuate switches energizing the compressor motor and the auxiliary heaters; and the switch actuated by the cam of the modulating motor periodically closes the off-motor circuit to energize same if heat is no longer required. Also arranged across the control circuit are an indoor fan motor relay, a compressor motor relay, a modulating motor relay, an indoor thermostat, and an outdoor thermostat. The aforedescribed components are so arranged that during heating, the compressor operation is initiated before auxiliary heater operation; and compressor operation is discontinued after auxiliary heater operation ceases. As a result, on and off operation of both the compressor and auxiliary heaters is minimized and compressor operation is maximized, with a resultant reduction of operating costs.

An important feature of the invention resides in the fact that the novel circuit maintains compressor operation so long as heat requirements exist.

Another feature of the invention resides in the arrangement of an outdoor thermostat which acts to make ready the auxiliary heaters for use. Thus depending on outdoor ambient temperatures, a given number of heaters is made available for actuation.

A further feature of the invention resides in the use of the modulating motor which functions to periodically close the off-motor circuit so as to permit energization of same when heating is no longer required, thereby making heating control a function of both thermostat action and the modulating motor.

The specific details of a preferred embodiment of the invention, and their mode of functioning will be made most manifest, and particularly pointed out in clear, concise and exact terms in conjunction with the accompanying drawings, wherein:

FIGURE 1 is a graph plotting heat pump system capacity against load requirements;

FIGURE 2 is a schematic diagram of an air conditioning apparatus which includes a reverse cycle refrigeration system;

FIGURE 3 is a schematic wiring diagram of the control circuit for regulating the operation of a heat pump in accordance with the teachings of this invention;

FIGURE 4 is a diagrammatic view of the control motor cam and the switch means actuated thereby, FIGURE 5 is a diagrammatic view of the modulating motor cam and the modulating motor switch, and FIGURES 6A, 6B, 6C, 6D and 6E are diagrammatic views illustrating sequential operation of the control motor cam and switch means shown in FIGURE 4.

In FIGURE 1, there is shown a graph on which is ploted the capacity of a typical heat pump measured in B.t.u. per hour against outdoor ambient temperature. Line $a$ represents the heating capacity of the refrigeration system alone. Line $b$ represents the requirement in B.t.u. per hour of the area to be conditioned. It is evident that the refrigeration system can supply more heat at high outdoor ambient temperatures than at low ambient temperatures and that the heating requirement increases as the outdoor temperature falls.

The capacity line $a$ and the requirement line $b$ intersect at point $c$. Above an outdoor temperature represented by point $c$, the refrigeration system has excess capacity and by intermittent operation can supply the heat that may be required. At approximately a temperature represented by point $c$ the refrigeration system operates continuously. Below this temperature, the refrigeration system cannot supply adequate heat even if it runs continuously.

Resistance heaters are commonly used to provide additional heating capacity. Lines $d$, $e$, and $f$ represent the additional heating provided by each of three stages of auxiliary resistance heaters.

The controls may be constructed so that when the refrigeration system itself is unable to supply adequate heat, the first resistance heater is energized. Immediately, excess heating capacity is provided. If the outdoor temperature remains constant, the heater may be cycled on and off as required. However, as the outdoor temperature falls the heating requirement rises until it equals the combined capacity of the refrigeration system and first resistance heater (see point $g$). The second stage of resistance heat may be energized. Again, excess heating capacity is provided. If the outdoor temperature falls further such that the combined capacities of the refrigeration system, the first stage of resistance heat and the second stage of resistance heat fall below point $h$, a third stage of resistance heat may be energized. A more thorough understanding of the novel controls for the heat pump system will become apparent from the following description of the refrigeration system and the electrical control circuit.

Considering first the refrigeration system, in FIGURE 2, a compressor 10 is shown which compresses a suitable refrigerant and forces it through line 11 to a conventional four-way valve 12. In the position shown, valve 12 causes the compressed refrigerant to pass through line 13 to outdoor heat exchange coil 14. From outdoor coil 14 the condensed refrigerant flows through line 15 to the indoor heat exchange coil 16. Conventional expansion means 17 may be disposed in line 15. Vaporized refrigerant passes from the evaporator through line 18 to valve 12 and then from valve 12 through the suction line 19 back to the compressor.

Fan 20 driven by motor 21 is disposed adjacent the outdoor coil 14 to pass air over the coil to assist in condensing the refrigerant therein.

A second fan 22 driven by motor 23 may be disposed adjacent indoor coil 16 to pass the air to be cooled through the coil and into the duct 24, which communicates with the area to be treated.

As aforedescribed, the refrigerating circuit operates to cool the air. However, when it is desired to use the refrigeration circuit on a reverse cycle to provide heating, the flow of refrigerant is reversed through a portion of the circuit by manipulating four-way valve 12. Refrigerant then passes through discharge line 11 to valve 12 and line 18 to the indoor coil 16. The condensed refrigerant flows through line 15 and expansion means 17 therein to outdoor coil 14. From outdoor coil 14 the refrigerant passes through line 13, valve 12 and suction line 19 back to the compressor. When the refrigerating apparatus is operated in the foregoing manner, heat exchange coil 16 heats the air passing over the coil into the duct 24 to heat the area to be conditioned. As is readily seen in FIGURE 2, the solid arrows depict the direction of flow of the refrigerant when the system is used for cooling, and the dashed arrows depict the direction of flow of refrigerant when the system is used for heating.

As the heating capacity of a given heat pump system is often inadequte in cooler climates, auxiliary heaters may be provided for supplementing the required heat supply. Disposed in duct 24 adjacent the indoor coil are a plurality of electric resistance heaters 25, 26 and 27.

The expansion means 17 may comprise a capillary tube as shown in FIGURE 2 or may be a pair of thermal expansion valves connected together in a fashion which is known to those persons skilled in the art, such that one valve is operable during cooling operation while the second valve is bypassed, and the second valve is operable during heating operation while the first valve is bypassed.

As viewed in FIGURE 3, the circuit 30 is seen to comprise a primary operating circuit 31, and a secondary control circuit 32. Operating circuit 31, which will normally be a 220-volt single-phase 60-cycle circuit, is coupled via transformer 33 to control circuit 32 which in the preferred embodiment of the invention will be a 24-volt circuit.

It will, of course, be understood by those skilled in the art that the proposed voltages here given are given by way of example, and not limitation. Any desired operating voltage may be employed for the operating circuit and the control circuit to suit desired design conditions. The use of the relatively low voltage in the control circuit 32 permits economies in the circuit components and wiring and minimizes danger to the user manipulating the manual switches.

The operating circuit 31 will be understood by those skilled in the art to be a part of the circuit utilized for energizing the relatively high power demand components of the air conditioning apparatus. Lines L1 and L2 may extend from the circuit utilized in energizing the fan motors and compressor motors of the air conditioning equipment. Arranged across L1 and L2, as viewed in FIGURE 3, are normally open indoor fan relay contact 34 and indoor fan motor starter coil 36. Connected in parallel with fan motor starter coil 36 are a modulating timer motor 37 and indoor fan motor starter auxiliary contact 35.

For each auxiliary heater 25, 26 and 27 which will be a conventional strip heater, such for example as the CU689 type manufactured by the H. W. Tuttle Co., a strip heater contactor and an associated thermostat switch of the Klixon type are provided. In FIGURE 3, three auxiliary heater circuits are shown and reading from top to bottom the associated thermostat switches and coils respectively will be referred to as 40 and 41; 42 and 43; and 44 and 45. Upon closing of the normally open switch in each circuit as will be hereinafter described each strip heater coil will be energized, closing its contact 41′, 43′ and 45′, respectively, and energizing the respective heater.

In the control circuit 32, the indoor fan motor relay coil 50 is connected across lines C1 and C2 of the circuit. A manually controllable fan selector switch 51 is arranged in the circuit with fan relay coil 50. When switch 51 is in the dotted line position, the indoor fan will run continuously. When switch 51 is in the solid line position, control of indoor fan is automatic in response to operation of room thermostat 52. Room thermostat selector switch 53 is provided in control circuit 32. The solid line position shown is the "heat" position; the dotted line position is the "cool" position; and the intermediate position is the "off" position. Arranged across lines C1 and C2 is the compressor motor relay coil 54 and normally open reverse valve solenoid relay contact 55. The closing of reverse valve relay contact 55 is controlled by reverse valve relay coil 56 arranged across C1 and C2 through switch 57.

Switch 57 is of the single-pole double-throw type movable between the solid line position and the dotted line position shown on the drawing. Switches 58, 59, 60, 61, 62 and 63 are of the single-pole, single-throw type. These switches are sequentially cam actuated as hereinafter described. Arranged in the circuit for control by switch 57 is an off-motor 64 in parallel with an on-motor 65. On-motor 65 and off-motor 64 drive a common shaft 66 (FIGURE 4) in opposite directions. A cam 67 on this shaft acts to open and close the circuit switches as will be made hereinafter more apparent.

Modulating relay contacts 68 and 69 operating alternatively are arranged in series with the on-motor 65 and off-motor 64 respectively. Relay contacts 68 and 69 work opposite to each other and are alternatively opened or closed by the actuation of modulating relay coil 70 connected across lines C1 and C2 through the room thermostat 52 and room thermostat selector switch 53.

Normally open modulating motor switch 71 is arranged in the off-motor circuit, switch 71 being closed periodically by cam 72 on shaft 73 of modulating timer motor 37.

An outdoor thermostat 75, illustrated as a three-position type, is arranged in the circuit with switch 57. Thermostat 75 has high contact 76, medium contact 77 and low contact 78. Normally closed switches 58, 59 and 60 in series with contacts 76, 77 and 78 respectively are actuated by movement of the cam 67 driven by on-motor 65 and off-motor 64.

Considering now FIGURES 4 and 6, there is shown the relationship between cam 67 and the switches sequentially actuated thereby. Switch 57 is separately mounted and is adapted to be actuated first when cam follower 83 is moved counterclockwise. See FIGURE 6A. Switches 61, 58, 62, and 59 may be housed in a single casing 84. A predetermined time after actuation of switch 57, cam follower 85 is moved and the switches 61, 58, 62 and 59 will be actuated relatively quickly one after the other. See FIGURES 6A-6D. After a brief interval, cam follower 86 will be moved to actuate switches 63 and 60 in casing 87. See FIGURE 6E. When shaft 66 is rotated clockwise, the switches will be actuated in a reverse sequence.

In FIGURE 5 there is shown modulating timer motor cam 72 driven by shaft 73 of the modulating timer motor 37. Cam 72 periodically actuates cam follower 88 to close normally open switch 71. By virtue of the novel configuration and mounting of cam 72, switch 71 may be actuated only a portion of each cycle of cam 72. Further, the cam has two (2) mounting holes therein. When shaft 73 extends through opening 89, the wide lobe 91 of cam 72 actuates switch 71. When shaft 73 extends through opening 90, narrow lobe 92 actuates switch 71.

Assuming that the contacts 76, 77 and 78 of outdoor thermostat 75 are closed, the on-motor 65 remains operative through a complete cycle. As shaft 66 and cam 67 rotate under the influence of on-motor 65, switch 57 will be moved to the dotted line position by cam follower 83. The other six switches will be actuated in the following sequence after switch 57 by cam 67 in a presently preferred form of the invention.

|  | Min. |
| --- | --- |
| Switch 61 | 0.57 |
| Switch 58 | 0.59 |
| Switch 62 | 0.61 |
| Switch 59 | 0.70 |
| Switch 63 | 0.81 |
| Switch 60 | 0.97 |

Considering the off-cycle, assume that the narrow lobe 92 of cam 72 is actuating switch 71. The shaft 66 and cam 67 will rotate under the influence of off-motor 64 and will actuate the switches in a relatively slow off-cycle.

Again, considering the off-cycle, assume that the wide lobe 91 of cam 72 is actuating switch 71. Shaft 66 and cam 67 will be rotated by the off-motor 64 and will actuate the switches in a relatively fast-off-cycle. The timed sequence for a presently preferred off-cycle of operation is tabulated below:

|  | Fast Off-cycle, min. | Slow Off-cycle, min. |
| --- | --- | --- |
| Switch 60 | 0.04 | 0.03 |
| Switch 63 | 0.10 | 0.10 |
| Switch 59 | 0.23 | 2.06 |
| Switch 62 | 0.27 | 2.09 |
| Switch 58 | 0.30 | 2.12 |
| Switch 61 | 0.34 | 2.14 |
| Switch 57 | 4.12 | 8.17 |

*Operation*

Considering first the operation of the heat pump during the cooling season, fan selector switch 51 may be set in the solid line position for automatic operation and thermostat selector switch 53 is set in the dotted line position for cooling. Upon a demand for cooling, thermostat 52 closes energizing compressor relay 54 and thereby energizing the compressor motor.

The reverse relay 56 is not energized, hence valve 12 is in the position shown in FIGURE 2. Compressor 10 pumps refrigerant through discharge line 11, valve 12, line 13, outdoor coil 14, line 15, indoor coil 16, line 18, valve 12 and suction line 19 in such order. Coil 14 acts as a condenser and coil 16 acts as an evaporator. The air passed over coil 16 by fan 22 is cooled.

Winter operation of the heat pump may best be considered under different operating conditions, first, when the refrigeration system itself can supply the required heat load and second, when it is necessary to utilize the auxiliary heaters in conjunction with the refrigeration system where the heating requirements of the conditioned area are not fulfilled by the refrigeration system alone.

During the heating season, the fan selector switch 51 is set in the solid line or "automatic" position and thermostat 53 is set in the solid line or "heat" position. Thereafter, when room thermostat 52 senses a condition warranting heating, the circuit to the modulating relay coil 70 is closed. Energization of relay coil 70 closes contact 68 in series with on-motor 65 and opens contact 69 in series with off-motor 64. When on-motor 65 is energized, it rotates shaft 66 which extends between on-motor 65 and off-motor 64, said shaft supporting cam 67 which may sequentially actuate switches 57, 61, 58, 62, 59, 63 and 60. At the beginning of the cycle of rotation of the on-motor 65, switch 57 is moved to the dotted line position thereby breaking one circuit of the on-motor 65; and making the circuit to reverse relay coil 56. Assuming that the contacts of outdoor thermostat 75 are open, on-motor 65 stops as soon as switch 57 is actuated. Energization of reverse relay coil 56 closes contact 55 energizing compressor motor relay coil 54, and then the compressor motor.

At the same time that contact 55 is closed, indoor fan relay 50 is energized, closing contact 34. A circuit is completed across leads L1 and L2 energizing indoor fan starter coil 36 and indoor fan motor 23 (FIGURE 3).

The modulating timer motor 37 is energized through indoor fan relay contact 34 which is closed as a result of energization of relay 50 and through indoor fan motor starter auxiliary contact 35 which is closed as a result of energization of indoor fan motor starter coil 36. So long as the indoor fan and compressor are operating, the modulating timer motor 37 will also be in operation. Cam 72 on shaft 73 of motor 37 periodically closes the modulating motor switch 71 thereby permitting energization of off-motor 64 in the event that relay contact 69 is closed. This closing of relay contact 69 occurs whenever room thermostat 52 senses sufficient heat thereby breaking the circuit to modulating relay 70, causing relay contact 69 to return to its normally closed position. When off-motor 64 is energized by the periodic closing of contacts 71, it rotates the heretofore mentioned cam shaft 66 between motors 64 and 65 in an opposite direction to that produced by on-motor 65. Off-motor 64 will not be actuated so long as room thermostat 52 senses a need for heat and keeps relay 70 energized.

It will be noted in FIGURE 1, that it has been assumed that the heat pump system is operating to the right of point $c$ at point $k$, at an outdoor temperature high enough that the heating requirements can be met by the refrigeration system functioning alone. Thus each time thermostat 52 is satisfied, the compressor is deenergized.

As the contacts of outdoor thermostat 75 always remain open, the on-motor 65 cannot be energized from any of the secondary circuits which include a contact 76, 77, or 78. Thus control of cam 67 will alternate between the on-motor and off-motor and only switch 57 of the switches actuated by cam 67 will be operative in the circuit.

Again considering FIGURE 1, assume that the outdoor temperature is at a low value represented at point $m$. The refrigeration system alone is inadequate to meet the requirements. Thus additional heat is required to fulfill comfort requirements of the conditioned area.

Considering now FIGURE 3, outside thermostat 75 will detect the lowered outdoor ambient temperature and high contact 76 will be closed, completing the circuit through normally closed switch 58. As a result, a circuit parallel to switch 57 is established to on-motor 65, causing cam 67 to continue to rotate after the actuation of switch 57, which permitted energization of the compressed motor. Continued rotation of cam 67 closes switch 61 to energize auxiliary heater contactor 41 and heater 25. On-motor 65 continues rotating until cam 67 opens switch 58, breaking the on-motor circuit.

Upon the requirement of additional heat as indicated by the closed condition of outdoor thermostat contact 77, at a lower outdoor ambient the on-motor 65 is energized via thermostat contact 77 and switch 59 to cause closing of auxiliary heat switch 62, energizing relay 43 and thereby auxiliary heater 26. Shortly after the auxiliary heater is energized, the action of the on-motor 65 opens switch 59, deenergizing on-motor 65. Similarly if further heat is required low contact 78 of outdoor thermostat 75 is closed completing a circuit to on-motor 65 via contact 78 and switch 60. Cam 67 closes 63, energizing relay 45 to energize heater 27. Cam 67 continues rotating until switch 60 is opened at which time all the parallel circuits to on-motor 65 are broken.

Assuming that the combined capacity of all three heaters and the refrigeration system is more than adequate to meet the requirements of the conditioned area, it is evident that the third heater may be deenergized. Room thermostat 52 opens, deenergizing modulating relay 70, causing relay contacts 68 and 69 to assume their normally open and normally closed position, respectively as seen in FIGURE 3. The compressor motor and auxiliary heaters are still operating however, along with modulating motor 37. At each rotation of modulating motor 37, modulating motor switch 71 is closed for a brief period, thereby energizing off-motor 64. The effect is to cause cam 67 to rotate a few degrees each time off-motor 64 is energized, thus sequentially closing switch 60 and opening switch 63 to deenergize relay 45, opening contact 45′ and deenergizing heater 27.

During the time that the off-motor is being periodically energized and the total capacity of the unit is being reduced, it is possible for room thermostat 52 to sense the need for additional heat. When thermostat 52 closes, modulating relay 70 is energized closing contact 68 and opening contact 69. The on-motor will rotate to energize the required number of auxiliary heaters as determined by the positions of the contacts 76, 77, and 78 of outdoor thermostat 75. Thus the auxiliary heaters will be cycled on and off while the compressor motor runs continuously.

If thermostat 52 remains open, modulating relay 70 remains deenergized, contact 68 remains open, and contact 69 remains closed. Shaft 66 continues periodic rotation and cam 67 sequentially actuates switches 59, 62, 58 and 61 to deenergize auxiliary heaters 26 and 25 respectively. Assuming thermostat 52 remains open, off-motor 64 will be periodically energized and a relatively long time after the heaters have been deenergized cam 67 will move switch 57 to the solid line position, thus deenergizing the off-motor. The system is now deactivated pending the closing of thermostat 52, which signals the need for heat.

Considering again operation of the air conditioning apparatus when both the refrigeration system and the three auxiliary heaters are operative, room thermostat 52 may open indicating that the temperature in the space to be treated is at a predetermined level. The last energized heater 27 will be deenergized as explained above, however, auxiliary heaters 26 and 25 and the compressor remain operative. In the absence of an appropriate control, the operative components may, by virtue of override, maintain the space temperature above the control point.

The rate at which the temperature within a space will vary is a function of the physical size and nature of the elements within the space and means are provided for compensating for the effects of fast responding spaces as well as slow responding spaces. Such means comprise the cam 72. When cam 72 is supported on shaft 73 through opening 89 the wide lobe 91 actuates cam follower 88 of switch 71. The cam may also be supported on shaft 73 through opening 90 such that the narrow lobe 92 actuates cam follower 88 of switch 71. It is apparent that the switch 71 will be closed longer during each revolution of cam 72 when engaged by the wide lobe than when engaged by the narrow lobe. By selectively positioning cam 72 on shaft 73 through opening 89 or opening 90 respectively, a fast or slow off-cycle may be provided.

It is thus seen that by the utilization of the modulating timer motor 37, what amounts to a time delay, is interposed between the thermostatic opening and the deenergization of the auxiliary heating elements and the compressor. Additionally, so long as heat is required the heat pump compressor will be maintained operative.

While I have described a preferred embodiment of the present invention, I desire it to be understood that it may be otherwise embodied within the scope of the following claims.

I claim:

1. In air conditioning apparatus of the type including a refrigeration system operable to selectively heat or cool air, the combination of a compressor having an inlet and an outlet, an electric motor for actuating said compressor, first and second heat exchange coils coupled to said compressor inlet and outlet, respectively, when said apparatus is used for cooling, expansion means coupling said coils to each other, valve means coupled between said coils and said compressor for causing said first and second coils to be coupled to said compressor outlet and inlet, respectively, when said apparatus is used for heating, an auxiliary heater mounted proximate said first coil and means for controlling the operation of the electric motor and the auxiliary heater, said control means comprising: first circuit means including actuating means for said electric motor and air temperature responsive means effecting completion of said first circuit means; second circuit means including actuating means for said auxiliary heater; outdoor ambient temperature responsive means effecting completion of said second circuit means to permit energization of the auxiliary heater; and modulating means acting on said first and second circuit means to permit deenergization of the auxiliary heater and the electric motor actuating means only after a given time interval has elapsed after sensing of given temperature conditions by said first mentioned temperature responsive means.

2. Air conditioning apparatus as in claim 1 in which: the temperature responsive means effecting completion of the first circuit are responsive to temperatures in the area to be heated.

3. Air conditioning apparatus as in claim 1 in which said first circuit means and said second circuit means are provided with switch means; said modulating means including motor means for actuating said switch means sequentially to maintain the compressor in operation when the auxiliary heater is in operation.

4. A method for controlling the operation of a heat pump including a drive motor and auxiliary heater, said method comprising the steps of: energizing the heat pump drive motor in response to a first predetermined temperature condition in the area to be treated; energizing the auxiliary heater in response to a predetermined temperature condition of the outdoor ambient; and deenergizing the heater and the heat pump drive motor sequentially in response to both a second predetermined temperature condition in the area to be treated and a predetermined timed sequence, said deenergizing of the heater being performed before the deenergizing of the heat pump drive motor, whereby the heat pump drive motor will be maintained in operation at all times that the heater is in operation.

5. Control means comprising a heat pump, an auxiliary heater providing supplemental heat, temperature responsive means sensing the temperature in the area to be heated; relay means energized by said temperature responsive means; on-motor means energized by said relay means; first switch means controlling energization of the heat pump, said first switch means coupled to said on-motor means for movement thereby to a heat pump actuating position; outdoor temperature responsive means in parallel with said first switch means adapted to energize said on-motor means; second switch means controlling energization of the auxiliary heater, said second switch means being moved to an auxiliary heater energizing position by said on-motor upon energization thereof by said outdoor temperature responsive means; and off-motor means energized upon deenergization of said relay means to move said second and first switch means to a circuit deenergizing position in a sequence opposite to the sequence of energization of said auxiliary heater and heat pump.

6. Means as in claim 5 including: a modulating motor, means for electrically coupling said modulating motor to the heat pump so that upon energization of the heat pump said modulating motor will be energized; cam means driven by said modulating motor; and switch means periodically actuated by said cam means during movement thereof, said switch means being arranged to control the energization of said off-motor means, whereby the deenergization of the auxiliary heater and of the heat pump, respectively, will be delayed for a predetermined time.

7. Means as in claim 6 in which the cam means includes first means for mounting said cam means on the modulating motor shaft such that the modulating motor switch means may be closed for a relatively short time during each revolution of the cam means, and second means for mounting said cam means on the modulating motor shaft such that the modulating motor switch means may be closed for a relatively long time during each revolution of the cam means whereby the time to deenergize the auxiliary heater and heat pump respectively may be varied.

8. In an air conditioning apparatus having a reverse cycle refrigeration system comprising a compressor, reversing means, an outdoor coil, expansion means and an indoor coil: motor means for driving the compressor; temperature responsive means for sensing the temperature of the area to be conditioned; an auxiliary heater for supplementing the heat provided by the refrigeration system to the area to be conditioned; a step controller for sequentially energizing and deenergizing said compressor motor means and said heater, said controller comprising first and second switch means for energizing and deenergizing said compressor motor means and said heater respectively, an on-motor serving to actuate said first and second switch means when the on-motor rotates in a first direction to sequentially energize said compressor motor means and said heater respectively, an off-motor serving to actuate said first and second switch means in a reverse sequence to sequentially deenergize said heater and said compressor motor means respectively; means adapted when actuated to energize said on-motor; means adapted when actuated to energize said off-motor; and modulating means for controlling actuation of said off-motor and said on-motor energizing means.

9. In air conditioning apparatus having a heat pump for furnishing heat to an area to be conditioned: motor means for driving the heat pump; temperature responsive means detecting the temperature in the area to be conditioned; an auxiliary heat furnishing device to supplement the heat provided by the heat pump; on-motor means effecting the completion of a control circuit; said temperature responsive means including a relay adapted upon a call for heat to instantaneously energize said on-motor; a first switch in said control circuit for energizing said heat pump motor, said switch being moved to a heat pump motor energizing position by said on-motor; a second switch in said control circuit for energizing said auxiliary heat furnishing device, said second switch being closed by energization of said on-motor; and an off-motor rotating in a direction opposite to that of said on-motor for effecting the opening of said second switch for deenergizing the auxiliary heat furnishing device and for effecting movement of said first switch for deenergizing said heat pump motor and means for energizing said off-motor.

10. An air conditioning apparatus comprising means to heat a space including a heat pump, a plurality of auxiliary electrically operable heat furnishing means: control motor means; first switch means driven by said control motor means having a plurality of switches which are operated in sequence upon energization of said motor means, a first switch of said control plurality of switches moving after a predetermined movement of said control motor means in a first direction; temperature responsive means sensing the temperature of the aforementioned space, relay means having a coil and second switch means controlling the operation of the control motor means; means adapted to connect said relay means through said temperature responsive means to a source of power; motor means for driving said heat pump; means including said first switch for connecting said motor means to a source of power whereby upon a call for heating by said temperature responsive means the heat pump is energized and heat is furnished to the space; means including the remaining of said plurality of switches for sequentially connecting said plurality of heat furnishing means to a source of power upon continued operation of said control motor means in a first direction; and means to slowly rotate said control motor means in a reverse direction upon satisfaction of the call for heat comprising modulating motor means acting on said control motor means and means operable in response to energization of the heat pump for connecting said modulating motor means to the source of power.

11. Means as in claim 10 in which said modulating motor means comprises a switch in circuit with said control motor means and a cam, said cam having first means for operatively connecting said cam to said modulating motor whereby said cam closes said switch for a relatively long interval during each revolution to provide rapid actuation of said plurality of switches, said cam having second means for operatively connecting said cam to said modulating motor whereby said cam closes said switch for a relatively short interval during each revolution to provide slow actuation of said plurality of switches.

12. A method as in claim 4 including the step of periodically readying the heater and the heat pump drive motor for sequential deenergization.

13. Control apparatus comprising a heat pump, an associated auxiliary heater for providing supplemental heat, a thermostat sensing the temperature in the area to be heated; a relay coupled to said thermostat in an electrical circuit which will be energized when said thermostat senses a demand for heat; a first switch controlling energization of the heat pump; a second switch controlling energization of the auxiliary heater; controller motor means adapted to be energized by said relay in either a first or second direction; said controller motor means being operatively coupled to said first switch and said second switch so that upon energization of said controller motor means in a first direction, said first switch will be moved to a position energizing said heat pump and said second switch will be moved to a position energizing said auxiliary heater and upon energization of said controller motor means in a second direction, said second switch and said first switch will be moved sequentially, said controller motor means first opening said second switch to deenergize said auxiliary heater and then after a predetermined delay moving said first switch to render the heat pump inoperative, and a modulating motor arranged in a circuit energized upon energization of the heat pump; and cam actuated control means driven by said modulating motor operable to delay the action of said controller motor means in sequentially shutting down the auxiliary heater and heat pump, said cam actuated control means including a switch in a circuit to said controller motor means.

14. Control apparatus comprising a heat pump, an associated auxiliary heater for providing supplemental heat, a first thermostat sensing the temperature in the area to be heated; a relay coupled to said first thermostat in an electrical circuit which will be energized when said first thermostat senses a demand for heat; a first switch controlling energization of the heat pump; a second switch controlling energization of the auxiliary heater; controller motor means adapted to be energized by said relay in either a first or second direction; said controller motor means being operatively coupled to said first switch and said second switch so that upon energization of said controller motor means in a first direction, said first and second switches are moved to energizing position, movement of said first switch energizing said heat pump, a second thermostat for sensing outdoor temperature adapted at a predetermined outdoor temperature to energize said auxiliary heater when said second switch is moved to energizing position; upon energization of said controller motor means in a second direction, said second switch and said first switch will be moved sequentially, said controller motor means first opening said second switch to deenergize said auxiliary heater and then after a predetermined delay moving said first switch to render the heat pump inoperative.

15. Control apparatus as in claim 14 in which said second thermostat is electrically coupled to said controller motor means, said second thermostat being adapted to energize said controller motor means in response to movement of said first and second switches to energizing position at said predetermined outdoor temperature.

References Cited by the Examiner

UNITED STATES PATENTS

| 2,266,238 | 12/41 | Newton | 257—290 XR |
| 2,776,543 | 1/57 | Ellenberger | 62—160 XR |
| 2,806,674 | 9/57 | Biehn | 257—290 |
| 2,902,220 | 9/59 | Myck et al. | 257—290 |
| 2,934,323 | 4/60 | Burke | 257—290 XR |

CHARLES SUPALO, *Primary Examiner.*

HERBERT L. MARTIN, JAMES W. WESTHAVER, *Examiners.*